May 2, 1961  R. E. SCOTT  2,981,991
SELF-SEALING SNAP FASTENER
Original Filed April 13, 1950
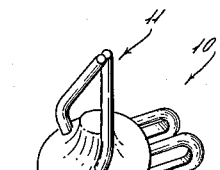
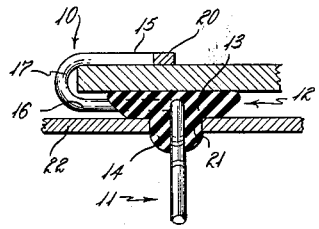
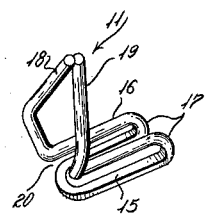
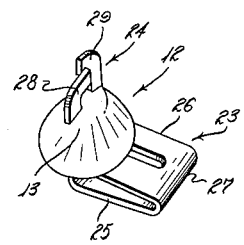
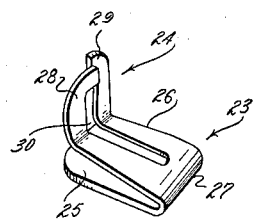
INVENTOR
ROBERT E. SCOTT
BY *Strauch, Nolan & Diggins*
ATTORNEYS

United States Patent Office 2,981,991
Patented May 2, 1961

2,981,991

SELF-SEALING SNAP FASTENER

Robert E. Scott, Southfield Township, Oakland County, Mich., assignor to Gagnier Fibre Products Company, Oak Park, Mich., a corporation of Michigan Application Oct. 1, 1951, Ser. No. 249,071, which is a division of application Ser. No. 155,666, Apr. 13, 1950, now Patent No. 2,643,433, dated June 30, 1953. Divided and this application Dec. 27, 1954, Ser. No. 477,729

3 Claims. (Cl. 24—73)

This invention relates to improved self-sealing hook head snap fastener elements with permanent sealing means, and this application is a division of my copending application Serial No. 249,071 filed October 1, 1951, now abandoned, which in turn is a division of my application Serial No. 155,666 filed April 13, 1950, now United States Letters Patent No. 2,643,433 issued June 30, 1953.

More particularly the invention concerns itself with fastener elements especially suitable for securing members upon a surface of a motor vehicle while preventing leaks and corrosion at the points where holes are provided in the vehicle surface to receive the fasteners.

A type of fastener which has found wide use in automobile trim panel holding construction is illustrated in Figures 1 and 4 of the accompanying drawings and comprises generally a single piece of wire or other metal form formed into a hook head portion and an angularly projecting shank portion, the shank portion consisting of two legs positioned substantially normal to the plane of the head portion and bowed outwardly with respect to each other between the point of attachment to the head and the tip of the shank. The tips of the legs are usually in close proximity to each other and commonly overlap.

In the attaching of a trim panel to an automobile body, for example, the head portion engages the trim panel and the legs are forced through a hole provided in the body.

In this connection, however, a severe problem has been encountered in that a bad leak is created by the presence of the hole whereby water can reach interior appointments as well as interior metal surfaces which have not been protected against external corrosive influences. Attempts have been made to stop such leaks by the use of soft rubber gaskets, but difficulty has been experienced in fitting gaskets properly to the odd shapes which are characteristic of this type of fastener. Such separable gaskets, however carefully formed, permit some leakage along the surfaces of the fastener legs. Further, they have an added disadvantage in that the gaskets are positioned by hand and mass production techniques result in an appreciable number of such gaskets being omitted. Some of this difficulty stems from carelessness of labor and some from a tearing of the gasket as it is slipped over the bowed portion of the fastener legs, a fact not discernable to the worker since the shank is concealed from his view during assembly with the body. Whatever the reason, however, many fasteners have been and are used without the gasket provided therefor.

The foregoing difficulties are overcome herein by providing this fastener with a body of sealing material integrally bonded at the juncture of the head with the shank, and it is the major object of this invention to provide such a hook head fastener with a permanently bonded body of rubber or like deformable material where the shank joins the inner arm of the hook head which not only seals the hole during assembly with the vehicle but effectively aids the fastener action.

Other and more detailed objects of the invention will become apparent from a consideration of the following specification, the appended claims and the accompanying drawings, throughout the several views of which like reference characters indicate like parts, and wherein:

Figure 1 illustrates an embodiment of a complete fastener of the invention with the deformable sealing body incorporated;

Figure 2 is a cross sectional view of the Figure 1 fastener;

Figure 3 illustrates for purposes of description the metal portion of the fastener of Figure 1;

Figure 4 illustrates an embodiment of the invention incorporated in a fastener of a form usually stamped from sheet metal; and Figure 5 illustrates for purpose of description the metal portion of the fastener of Figure 4.

Referring now more particularly to the drawings, the metal portion of the fastener of the invention consists generally of a hook head portion 10 and a stud portion 11 preferably formed from a single piece of spring wire as illustrated in Figure 3. A rubber or like deformable plastic sealing body 12 having a dome portion 13 is permanently and integrally formed in the fastener in a manner such that the dome portion completely encloses a portion of each of the legs of the shank; that is, this portion of the legs is actually embedded in the thermoplastic body. A tuft 14 of the thermoplastic material is normally deposited at the apex of the dome 13 in the forming operation.

Head 10 of the fastener comprises spaced parallel arms 15 and 16 joined at one end by a bridge 17. Arm 16 which is joined to the shank and therefore disposed inwardly in an assembly will be identified as the inner arm, while arm 15 will be referred to as the outer arm. The shank 11 projects at right angles from the other end of the inner arm 16. The head, arms and the bridge consist of generally side by side members as shown in Figure 3, and the shank legs 18 and 19 are effective continuations thereof. Legs 18 and 19 are bowed intermediate their ends as illustrated providing from the shank tip to the head divergent and convergent sections which as the shank is thrust into a hole in the automobile body effect contraction and then expansion of the shank. The space 20 at the juncture between the ends of the legs and the inner head arm permits this action.

The deformable plastic body fills the space at 20, surrounds the adjacent inner head arm and leg portions so as to effectively embed them, and is of larger area than the hole in the automobile body into which the shank is thrust.

With specific reference to Figure 2, the fastener head portion in use attaches to a panel (unreferenced) while the shank 11 is inserted through an opening 21 in a portion of an automobile body 22. The opening 21 has a diameter somewhat smaller than the widest point between the bowed legs of the shank such that the legs, when being inserted, are forced together as the fastener is inserted and subsequently spring apart and press against the sides of opening 21. In this manner portions of the plastic body are brought to bear against the metal surfaces of the automobile body surrounding the opening 21.

Figures 4 and 5 illustrate another embodiment of the invention wherein the metal part of the fastener is made from a single piece of flat metal and consists of a head 23 and a shank 24. The head comprises outer and inner arms 25 and 26 joined by a bridge 27, the inner arm comprising side by side spaced members that at the end opposite the bridge are turned at about right angles to form shank legs 28 and 29. The space 30 at the juncture between the ends of the shank legs and the inner head arm side members is filled with the rubber or like plastic material of sealing body 12 as in the other embodiment.

In this specification the word "wire" is used broadly to include members other than those with circular cross sections. The particular shape of the cross section of such elements is not critical to the invention, and the word "wire" as used herein is intended to cover threads, filaments, and the like.

The exact shape or dimensions of the dome portion of the plastic body 12 is not critical to the invention. Rather in each instance they can be adapted to the particular conditions encountered. For example the width of the dome portion must be such as to completely seal the hole in the part which is penetrated by the legs of the fastener. Similarly, it is preferred that the plastic body have sufficient area to make a suitable frictional contact with the material surface in engagement therewith and to provide some resistance to displacement of the plastic body.

The nature of the plastic material is not critical to the invention. However, the principal utility of the invention is in creating a water tight seal and therefore a soft rubber has been found most suitable in most cases. In other uses, however, relatively harder thermoplastic materials may be found more desirable. For example where the fastener may be subjected to stresses which act on the plastic body, it is preferred that plastics presenting a relatively tough wear-resistant, yet somewhat resilient, surface may be used. The copolymers of vinyl chloride are examples of such materials. Alternatively a thermosetting resin like a phenol-formaldehyde resin may be used.

The article of the invention has found its greatest use in the securing of trim to surfaces of motor vehicles where a water-tight seal is desired. In addition to the more obvious advantages of the integrally formed metal and plastic structure, the article of the invention is more economical in its application than the combination of the wire fasteners and separate gasket pieces. The latter not only have to be formed in a separate operation, but must be fitted to the fasteners usually by hand. The article of the invention also makes unnecessary the use of such materials as cements and the like which are frequently used in order to produce a water seal.

The combination resilient plastic and metal fastener of the invention provides a fastener that has a positive action not attainable in prior art separate metal and rubber gasket assemblies since the plastic material at the juncture of the shank legs and the head always seals about and around the metal part of the fastener regardless of how the shank is deformed as it is thrust into the opening in the auto body. Usually plastic body 12 is applied to the metal portion of the fastener in a hot fluid state and allowed to cool to the illustrated shape in situ.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A self sealing snap fastener for removably attaching parts comprising a flexible metal portion having a hook head for engaging one of said parts and an attachment shank adapted to be thrust into an opening in the other part, said metal portion of the fastener being formed from a single piece of metal, said hook head comprising outer and inner substantially parallel arms joined at one end by a bridge, and the inner of said head arms comprising spaced members extending away from said bridge and turned at their ends remote from said bridge to extend at an angle away from said head and provide cooperating spaced spring shank legs which are adapted to be inserted into said opening, and a body of soft deformable resilient sealing material permanently united to said metal portion at and surrounding the juncture of said shank legs and the inner arm of said hook head whereby the space between said members at said juncture is always filled with said sealing material but the space between said arms is substantially unobstructed to receive said one part, said deformable body being larger than said opening so as to seal the latter weather-tight when the fastener is mounted on said other part.

2. A self sealing snap fastener for removably attaching parts comprising a flexible metal portion having a hook head for engaging one of said parts and an attachment shank adapted to be thrust into an opening in the other part, said metal portion of the fastener being formed from a single length of wire, said hook head comprising outer and inner substantially parallel arms joined at one end by a bridge, and said head arms both comprising spaced side by side members extending away from said bridge and with the inner arm members turned at their ends remote from said bridge to extend at an angle away from said head and provide cooperating spaced spring shank legs which are bowed intermediate their ends adapted to be inserted into said opening, and a body of soft deformable resilient sealing material permanently united to said metal portion and in which said metal portion is embedded at the juncture of said shank legs and the inner arm of said hook head whereby the space between said members at said juncture is filled with said sealing material but the space between said arms is substantially unobstructed to receive said one part, said body of sealing material being larger than said opening in said other part.

3. A self sealing snap fastener for removably attaching parts comprising a metal portion having a flexible hook head for engaging one of said parts and an attachment shank adapted to be thrust into an opening in the other part, said metal portion of the fastener being formed from a single piece of flat metal, said hook head comprising outer and inner substantially parallel arms joined at one end by a bridge, and the inner of said head arms comprising spaced members extending away from said bridge and turned at their ends remote from said bridge to extend at an angle away from said head and provide cooperating spaced spring shank legs which coact at their ends remote from the head to provide a tip adapted to be inserted into said opening, and a body of soft deformable resilient sealing material permanently united to said metal portion at the juncture of said shank legs and the inner arm of said hook head whereby the space between said members at said juncture is always filled with said sealing material but the space between said arms is substantially unobstructed to receive said one part, said body of resilient material being larger than said opening.

References Cited in the file of this patent

UNITED STATES PATENTS

| | | |
|---|---|---|
| 2,136,981 | Place | Nov. 15, 1938 |
| 2,439,516 | Holcomb | Apr. 13, 1948 |
| 2,455,669 | Gagnier | Dec. 7, 1948 |
| 2,528,388 | Rublee | Oct. 31, 1950 |

UNITED STATES PATENT OFFICE
CERTIFICATE OF CORRECTION

Patent No. 2,981,991

May 2, 1961

Robert E. Scott

It is hereby certified that error appears in the above numbered patent requiring correction and that the said Letters Patent should read as corrected below.

Column 4, line 33, after "ends" insert -- and --.

Signed and sealed this 17th day of October 1961.

(SEAL)
Attest:

ERNEST W. SWIDER
Attesting Officer

DAVID L. LADD
Commissioner of Patents

USCOMM-DC